(12) United States Patent
Schuster et al.

(10) Patent No.: US 9,106,120 B2
(45) Date of Patent: Aug. 11, 2015

(54) METHOD FOR TWISTING AN ARMATURE

(71) Applicant: Remy International, Inc., Pendleton, IN (US)

(72) Inventors: David Schuster, Indianapolis, IN (US); Eric Babb, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 254 days.

(21) Appl. No.: 13/647,812

(22) Filed: Oct. 9, 2012

(65) Prior Publication Data

US 2014/0096373 A1 Apr. 10, 2014

(51) Int. Cl.
| | |
|---|---|
| *H02K 15/02* | (2006.01) |
| *H02K 15/10* | (2006.01) |
| *H01R 43/06* | (2006.01) |
| *H01R 43/10* | (2006.01) |
| *H02K 15/00* | (2006.01) |
| *H05K 7/20* | (2006.01) |
| *H02K 13/04* | (2006.01) |

(52) U.S. Cl.
CPC ............ *H02K 13/04* (2013.01); *H02K 15/0031* (2013.01); *H02K 15/0081* (2013.01); *Y10T 29/49012* (2015.01)

(58) Field of Classification Search
CPC .................. Y10T 29/49009; Y10T 29/49011; Y10T 29/49012; H02K 15/03; H02K 15/16; H02K 3/12; H02K 3/14; H02K 3/487; H02K 3/345; H01R 43/08; H01R 39/32
USPC ............ 29/598, 596, 597; 310/208, 213, 214, 310/215, 234
See application file for complete search history.

(56) References Cited

U.S. PATENT DOCUMENTS

| | | | | |
|---|---|---|---|---|
| 3,562,570 | A | * | 2/1971 | Frank ............................ 310/234 |
| 3,812,577 | A | * | 5/1974 | Compton et al. ............... 29/597 |
| 4,153,985 | A | * | 5/1979 | Hibbard ......................... 29/597 |
| 4,247,978 | A | * | 2/1981 | Smith ............................ 29/596 |
| 4,719,377 | A | * | 1/1988 | Horie et al. ..................... 310/44 |
| 4,788,761 | A | * | 12/1988 | Crawford et al. ............... 29/596 |
| 4,818,911 | A | * | 4/1989 | Taguchi et al. ........ 310/216.105 |
| 5,969,455 | A | * | 10/1999 | Sakamoto ..................... 310/194 |
| 6,225,725 | B1 | * | 5/2001 | Itoh et al. ............... 310/216.004 |
| 6,335,582 | B1 | * | 1/2002 | Abukawa et al. ............. 310/214 |
| 6,580,193 | B2 | * | 6/2003 | Yoshikawa et al. ........... 310/215 |
| 6,841,913 | B2 | * | 1/2005 | Gorohata et al. ............. 310/180 |
| 7,146,706 | B2 | * | 12/2006 | Du et al. ........................ 29/596 |
| 7,211,918 | B2 | * | 5/2007 | Migita et al. .................. 310/215 |
| 7,287,311 | B2 | * | 10/2007 | Ichikawa et al. ................ 29/596 |
| 7,373,711 | B2 | * | 5/2008 | Migita et al. .................... 29/596 |
| 2002/0014806 | A1 | * | 2/2002 | Senoo et al. .................. 310/215 |
| 2006/0091759 | A1 | * | 5/2006 | Migita et al. .................. 310/218 |

* cited by examiner

*Primary Examiner* — David Angwin
(74) *Attorney, Agent, or Firm* — John V. Daniluck; Bingham Greenebaum Doll LLP

(57) ABSTRACT

A method of fabricating an armature for a motor includes providing a laminated assembly having a length, a central axis, and a plurality of open slots each extending the length and each configured to locate one conductor at a first greater radial distance from the central axis and another conductor at a second lesser radial distance from the central axis. A first conductor is inserted into a first one of the slots at the greater radial distance such that the first conductor extends out of the first one of the slots. A free end of the inserted first conductor is bent in each of a first direction and a second direction orthogonal to the first direction. A second conductor is inserted into a second one of the slots at the lesser radial distance such that the second conductor extends out of the second one of the slots. A free end of the inserted second conductor is bent in each of the two orthogonal directions.

19 Claims, 8 Drawing Sheets

METHOD FOR TWISTING AN ARMATURE

FIELD OF THE INVENTION

Various embodiments of the present invention pertain to improved methods for the fabrication of electrical devices, and in particular to the fabrication of armatures for motors.

BACKGROUND OF THE INVENTION

Devices such as electrical motors include a laminated armature and slotted commuter that rotate within a magnetic field. The armature includes a plurality of conductors that extend across the length of a laminated assembly. Preferably, this conductor resides within open ended slots in the laminated assembly.

As these conductors extend out of a slot, they need to be placed in electrical communication with the appropriate conductor of a commuter. In some instances, the conductors are not aligned with the appropriate conductor of the commuter (i.e., the laminated slots are rotationally spaced apart from the commuter conductor). In such cases, the end of the conductor extending through the slot needs to be bent so that it can be placed in contact with the commuter conductor.

In some fabrication processes, the slot conductors are compressed downward as the armature is rotated. The free end of the slot conductor is bent over from the angular location of the slots to the angular location of the commuter conductor. It is common to bend the slot conductors in a linear fashion, such that for each incremental rotational movement of the armature, the slot is compressed by a fixed amount. Often this bending profile is imposed by a mechanical cam and follower.

However, with the introduction of improved materials and the ability to generate sufficient mechanical power from smaller motors, the linear profiles can often be inadequate in terms of achieving a proper final alignment of the slot conductor relative to the commuter conductor, and further inadequate with regards to management of the bending stresses in the slot conductor.

What is needed are improved methods and apparatus for modern technology motors. The present invention provides this in novel and nonobvious ways.

SUMMARY OF THE INVENTION

One aspect of the present invention pertains to a method for fabricating an armature for a motor. Some embodiments include providing a laminated assembly having a plurality of slots extending the length and generally parallel to the axis, a plurality of separate conductors, a computer numerically controlled machine having a fixture actuatable in at least two orthogonal directions, and computer software for guiding the actuation of the fixture. Other embodiments include inserting the end of a conductor within a slot on the proximate face until the free end extends out of the slot on the distal face, and capturing the extended free end in the fixture. Still other embodiments include in the first direction actuating the fixture a first discrete distance by the software and bending the conductor relative to the laminated assembly, in the second direction actuating the fixture a second discrete distance by the software and bending the conductor relative to the laminated assembly, the second distance being related to the first distance by a ratio; and repeating the first direction actuating and the second direction actuating and changing the ratio during the repeating.

Another aspect of the present invention pertains to a method for fabricating an armature for a motor. Some embodiments include providing a laminated assembly having an open slot extending the length and generally parallel to the axis, a conductor, a computer numerically controlled machine electronically actuatable in rotation and axial translation, and computer software for guiding the actuation. Other embodiments include locating the conductor within the slot until the free end extends out of the slot. Yet other embodiments include placing the free end in the fixture. Still other embodiments include rotating the fixture and free end relative to the laminated assembly by the software. Further embodiments include axially translating the fixture and free end relative to the laminated assembly by the software, and coupling in the software the rotating and the translating so that the incremental translation of the fixture increases non-linearly and monotonically relative to the incremental rotation of the fixture.

Yet another aspect of the present invention pertains to a method for fabricating an armature for a motor. Some embodiments include providing a laminated assembly having a length, a central axis, and a plurality of open slots each extending the length and each adapted and configured to locate one conductor at a first greater radial distance and another conductor at a second lesser radial distance, a first conductor, a second conductor, a computer numerically controlled machine adapted and configured for electronically actuatable bending of a conductor in first and second orthogonal directions, and computer software for guiding the actuation according to first or second nonlinear bending profiles. Other embodiments include inserting the first conductor within a slot at the greater radial distance until the conductor extends out of the slot. Yet other embodiments include bending the inserted first conductor in each of the two orthogonal directions by the first nonlinear bending profile. Still other embodiments include inserting the second conductor within a slot at the lesser radial distance until the conductor extends out of the slot, and bending the inserted second conductor in each of the two orthogonal directions by the second nonlinear bending profile, wherein the second profile is different than the first profile.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

DESCRIPTION OF THE PREFERRED EMBODIMENT

Figure 1:
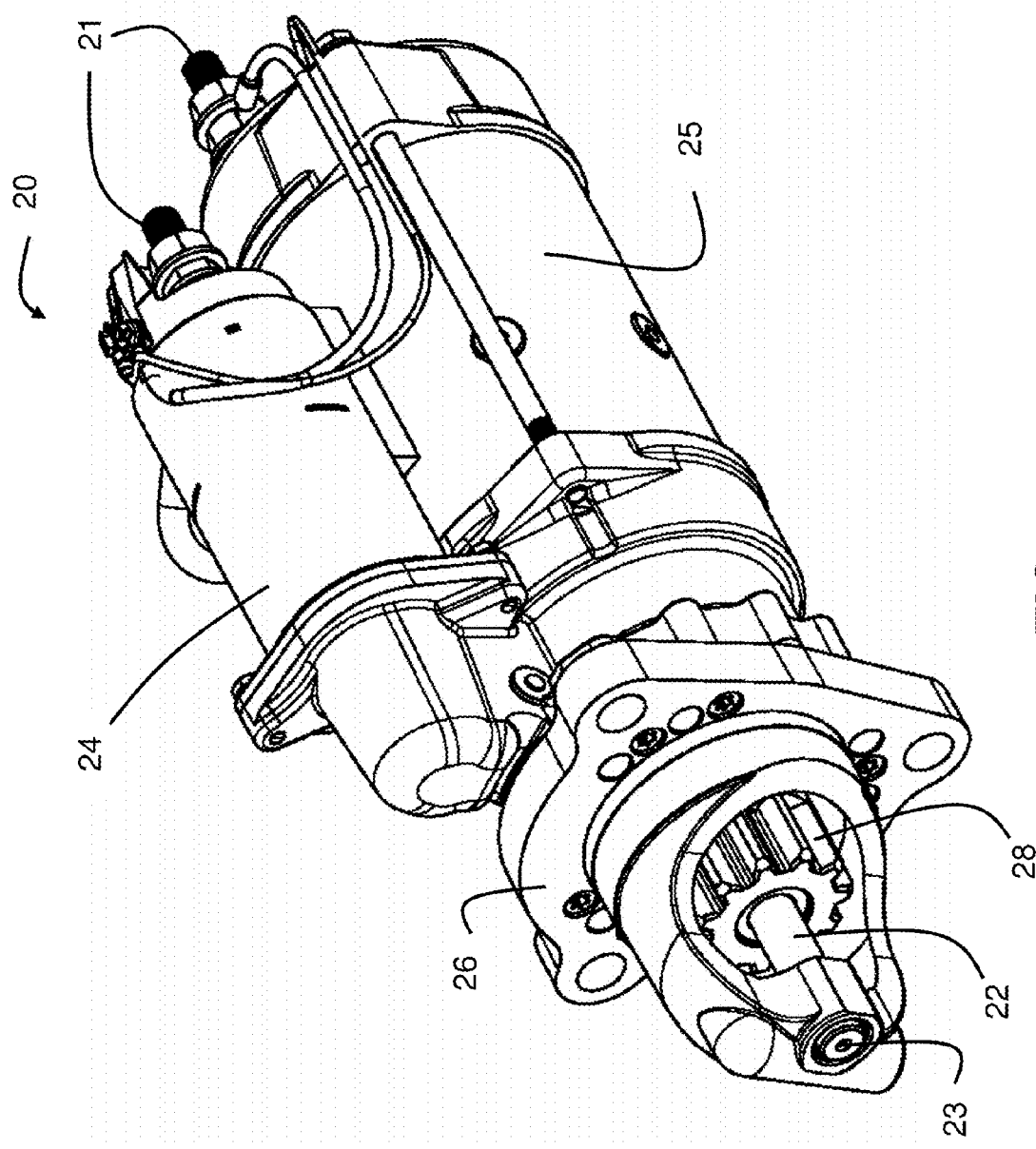
FIG. 1 is a front, top perspective view of a starter motor according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various embodiments of the present invention pertain to improved methods and apparatus for the fabrication of an armature for a motor. In some embodiments, the armature includes a plurality of conductors that extend across the length of a laminated assembly. Preferably, these conductors reside within open ended slots in the laminated assembly.

As these conductors extend out of a slot, they need to be placed in electrical communication with the appropriate conductor of a commuter. In some instances, the conductors are not aligned with the appropriate conductor of the commuter (i.e., the laminated slots are rotationally spaced apart from the commuter conductor). In such cases, the end of the conductor extending through the slot needs to be bent so that it can be placed in contact with the commuter conductor.

In various embodiments presented herein, the conductors extending out of the slots are bent according to a novel algorithm. This algorithm (or bending profile) applies to a variable amount of axial translation (such as compression) while the conductor extending out of the slot traverses in a direction orthogonal to the axial movement.

In some embodiments, the slots conductor is bent from the angular position of the slot to the angular position of the commuter conductor in an approximate straight-line. In such cases, the projected shape of the slot conductor looking down the axis of the armature is a chord.

It has been found that it is preferable to impose the axial bending of the slot conductor by taking into account this quarter past followed by the slot conductor. In so doing, the axial compression of the slot conductor can be related to the rotational movement of the armature (such as for those embodiments in which the armature is being twisted under the guidance of a CNC machine) by a quadratic function.

In some embodiments, the slope of the bending profile increases as the amount of twist increases (as the slot conductor is twisted from its initial shape to its final shape). Therefore, as the armature assembly is first twisted, a relatively small amount of translation is imposed into the slot conductor. However, as the rotational movement increases, increasing amounts of translation are applied, such that at the end of the bending process (when the slot conductor is generally aligned with the commuter conductor) the greatest amount of incremental translation (bending) is applied to the slot conductor.

However, in yet other embodiments, the relationship between translational movement and rotational movement is not necessarily described by a quadratic function. For example, in some embodiments of the amount of axial translation continuously increases as the armature is rotated. In yet other embodiments, the relationship between axial movement and rotational movement is nonlinear, and in still further embodiments the relationship includes monotonically increasing the slope of the bending profile.

FIG. 1 is a perspective drawing of a starter motor assembly 20 according to one embodiment of the present invention. Motor assembly 20 includes a pair of terminals 21 for receiving electrical power from a vehicle. Power from one terminal is provided to a solenoid 24 that engages starter motor 25 with the flywheel (not shown) of a vehicle. Start motor 25 includes a drive gear 28 placed on an output shaft 22 that rotates about a central axis 23. Assembly 20 includes a mounting face 26 for positioning and affixing assembly 20 to the bell housing or engine block (not shown) of the engine of the vehicle.

Figure 2:
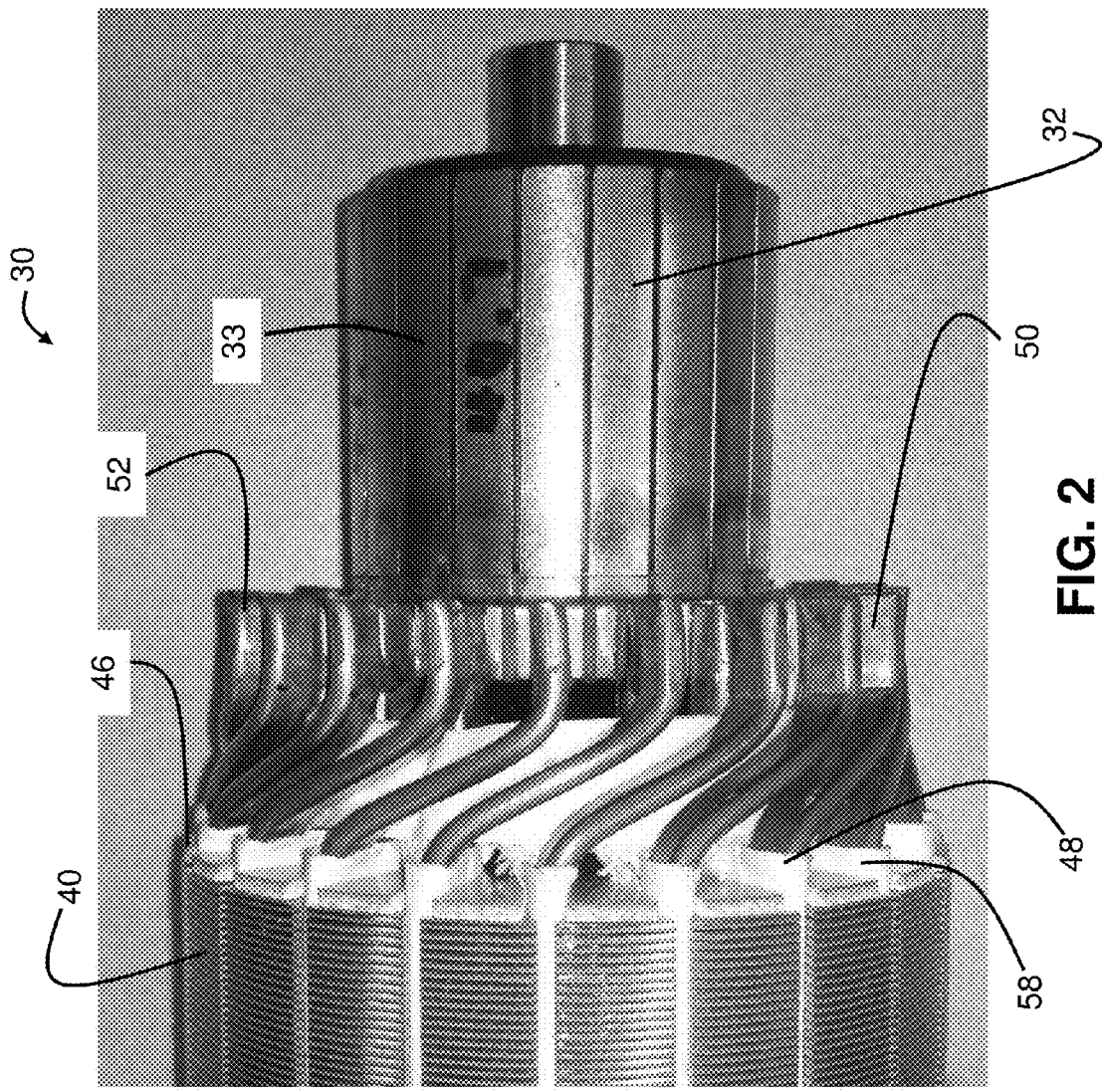
FIG. 2 is a photographic representation of a side view of a portion of an armature according to one embodiment of the present invention.

FIG. 2 is a photograph of a side view of an armature 30 located within starter motor 25. Armature 30 includes a laminated assembly 40 and a commuter 32. A plurality of conductors 50 are inserted within slots 48 of the laminated assembly 40. The free ends 52 of the conductors are placed in electrical communication with a corresponding conductor 33 of commuter 32.

Figure 3:
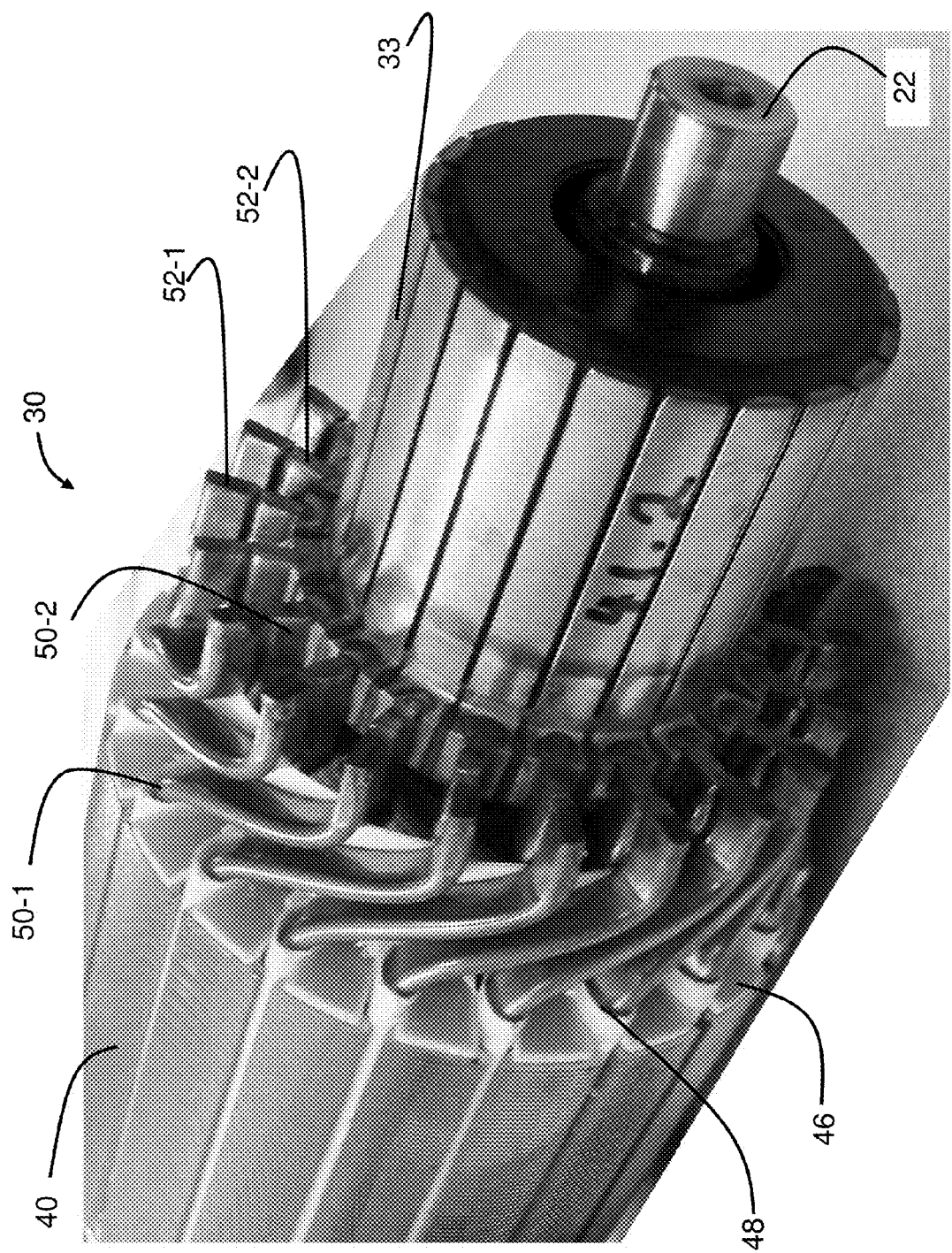
FIG. 3 is an end perspective photographic representation of the armature of FIG. 2.

FIG. 3 is a perspective photographic end view of the armature assembly 30 of FIG. 2. It can be seen that laminate assembly 40 (comprised of a plurality of separate laminate plates) defines a plurality of slots 48 that are open on each hand, extending from a first face 46 of assembly 42 and a second face 46. Slots 48 extend along the entire length of the stacked laminate plates.

Figure 6:
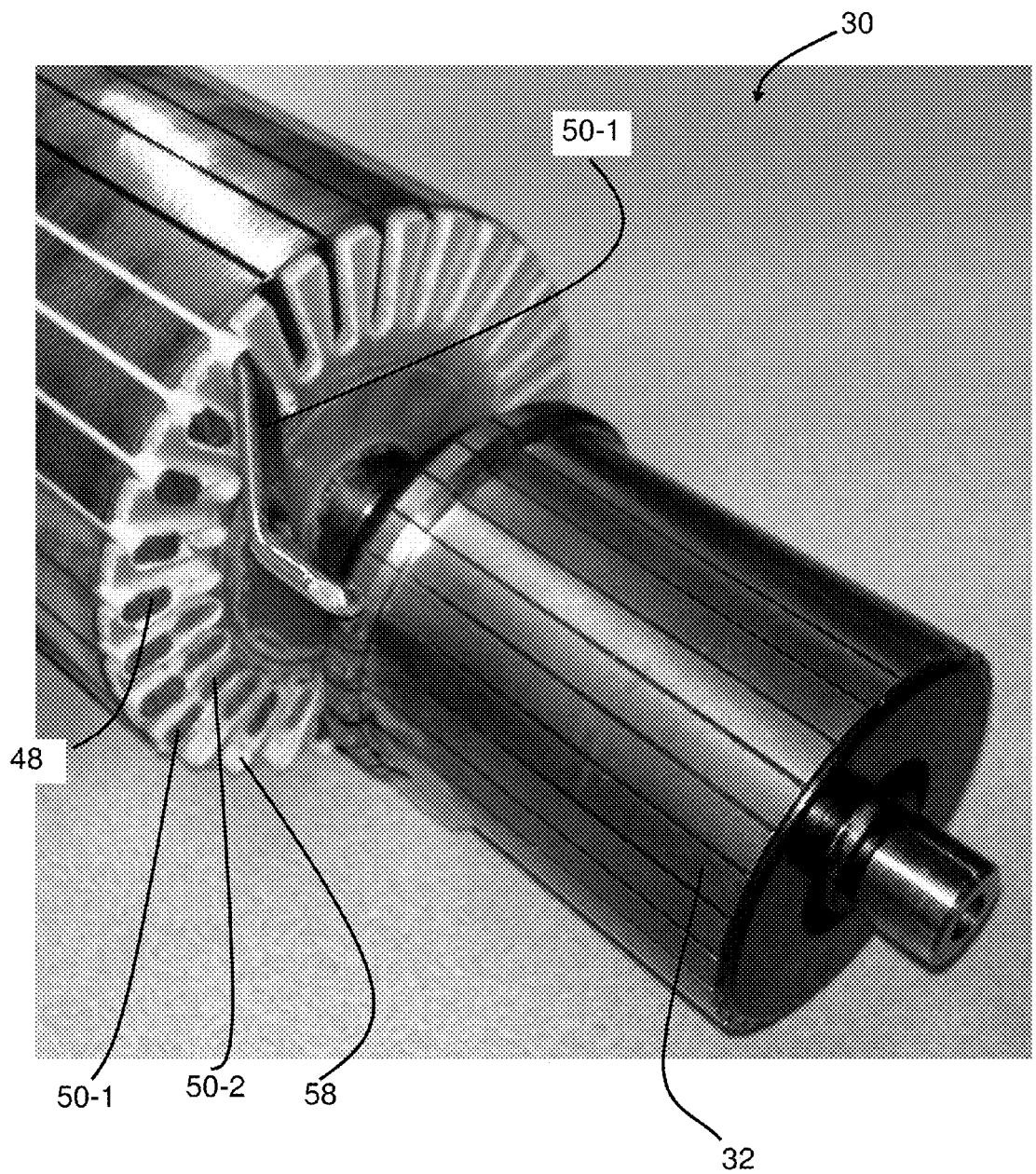
FIG. 6 is a perspective photographic representation of a modified armature according to one embodiment of the present invention.

Referring to FIGS. 3 and 6, it can be seen that each slot 48 is adapted and configured to receive both outer conductors 50-1 and inner conductors 50-2. In FIG. 6, it can be seen that all but one of the conductors 50-1 have been cut off to provide a clear view of a single conductor 50-1. As best seen in FIG. 6, each conductor 50-1 and 50-2 are electrically distinct from each other because of electrically insulating jackets 58.

Referring again the FIG. 3, it can be seen that the free ends of the conductors are bent both circumferentially and axially.

FIG. 3 shows that the outermost ring of conductors 50-1 are each bent over in an approximate L-shape that extends from the corresponding slot 48 to the corresponding commuter conductor 33.

Figure 8:
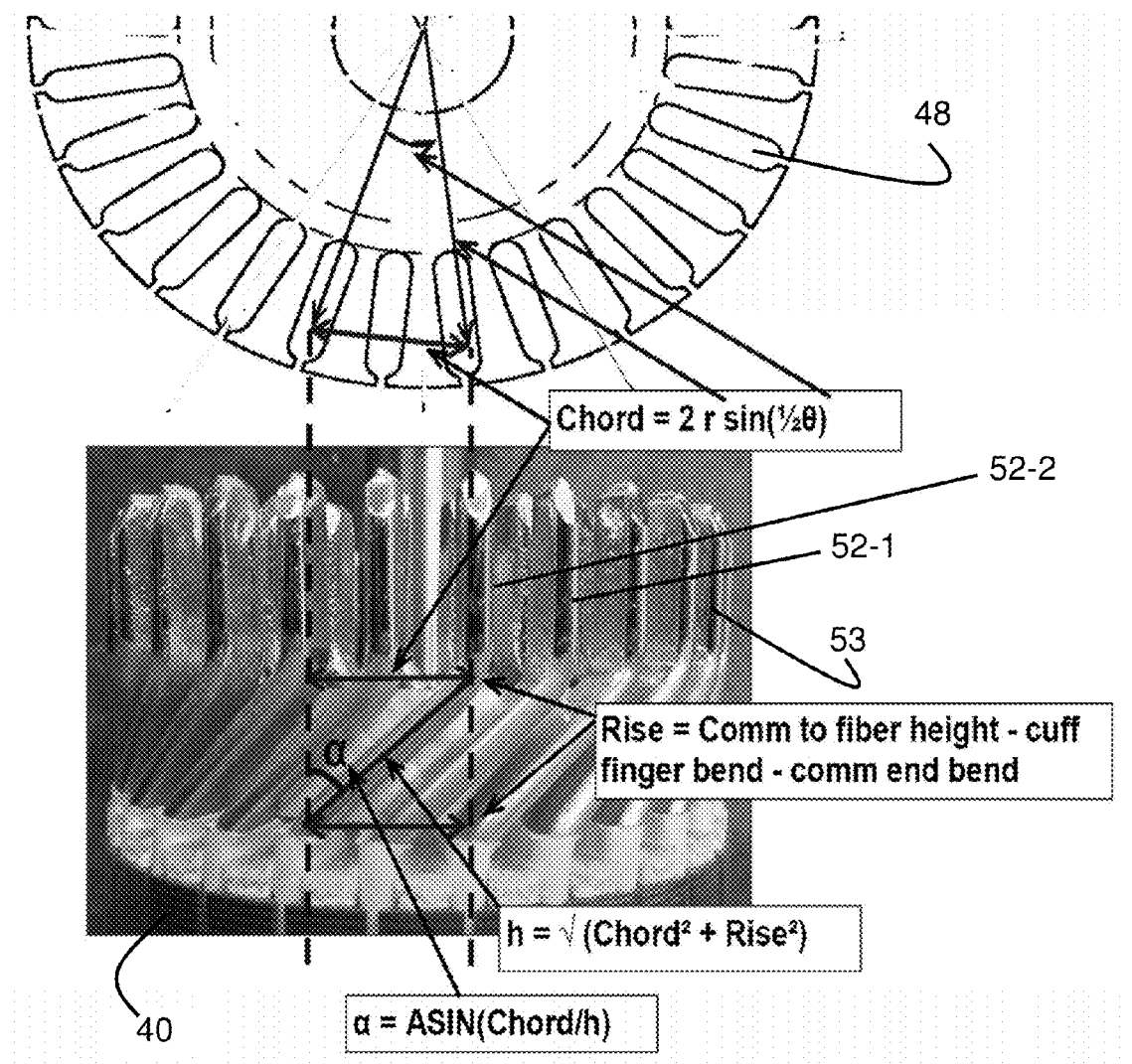
FIG. 8 is a combination of a photograph of a portion of an armature according to one embodiment of the present invention placed near a line drawing of an end view of a cutaway of the armature.

In some embodiments, armature 30 includes a second, inner ring 50-2 of conductors, although other embodiments of the present invention contemplate armatures with a single rank of conductors. As best seen in FIG. 3, in one embodiment armature 30 includes a second ring of conductors 50-2 that extend from corresponding slots 48 in laminate stack 40. The inner ring of conductors 50-2 are generally bent in an L-shape (not shown) similar to that of the bend shape shown for the outer ring of conductors 50-1. In some embodiments, the bend shape of the inner ring 50-2 is rotationally opposite to the shape of the outer ring 50-1. However, the free ends 52-1 and 52-2 are generally arranged side-by-side after the conclusion of the bending operation, these inner and outer free ends being close to each other. Preferably, a pair of inner and outer ends 52-1 and 52-2 are joined together in electrical communication, and further physically join together (preferably by an operation such as welding or brazing). In FIGS. 6 and 8 the free ends of the conductors can be seen coated in a brazing material 53.

Figure 4:
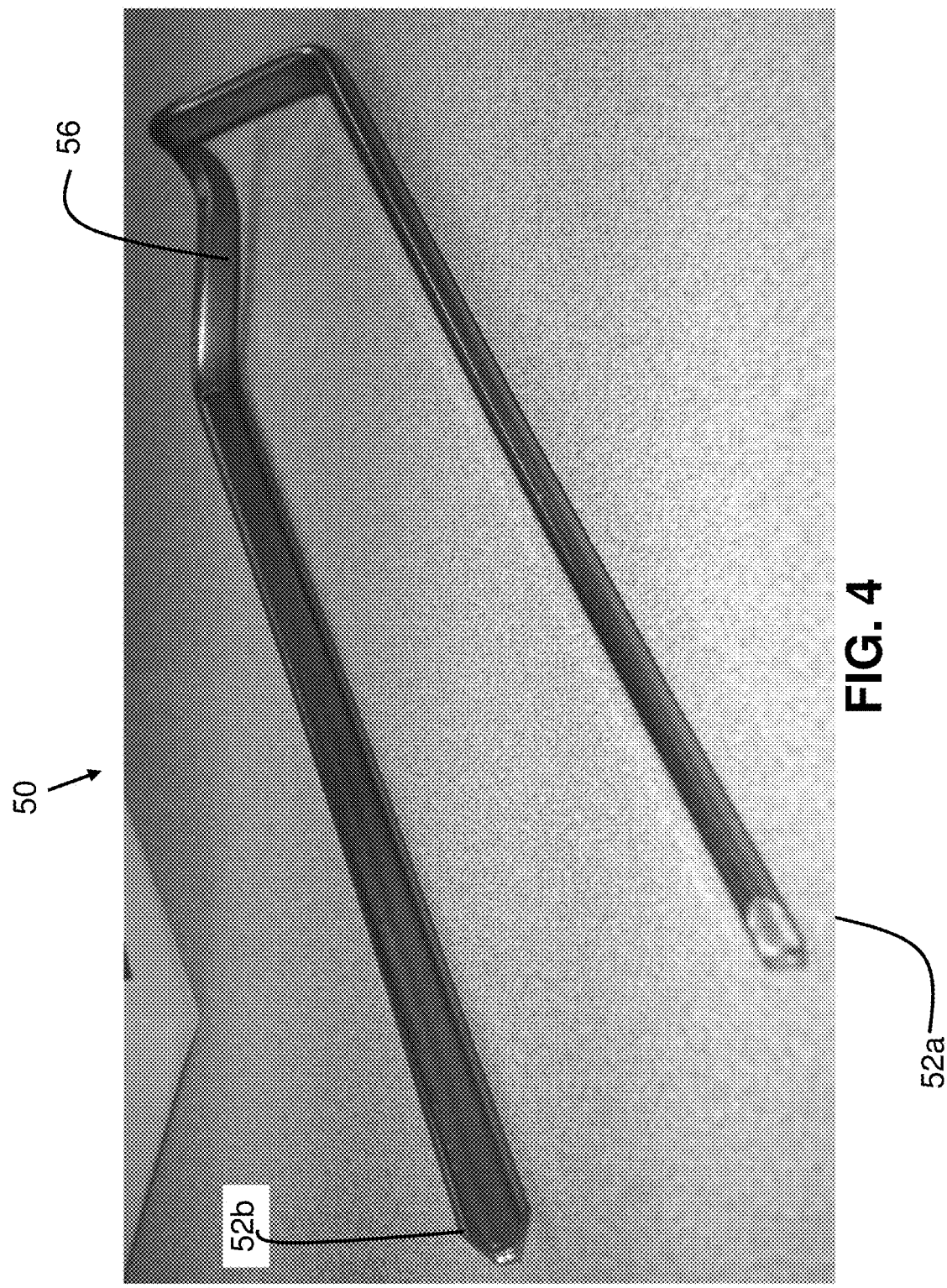
FIG. 4 is a perspective photographic representation of a conductor according to one embodiment of the present invention.

FIG. 4 is a photographic representation of a perspective view of a conductor 50 according to one embodiment of the present invention. In some embodiments, conductor 50 comprises a length of an electrically conductive material such as copper. Preferably, each conductor 50 is a separate length of conducting material, having a pair of free ends 52a and 52b separated by a midsection end 56 and configured in an approximate U-shape. In some embodiments, conductor 50 is adapted and configured such that free end 52a and free end 52b are inserted into circumferentially spaced apart slots 48. Although it has been shown and described as a conductor 50 configured in an approximate U-shape, the present invention is not so limited and includes the conductors in any shape, including generally straight conductors without a bend.

Figure 5:
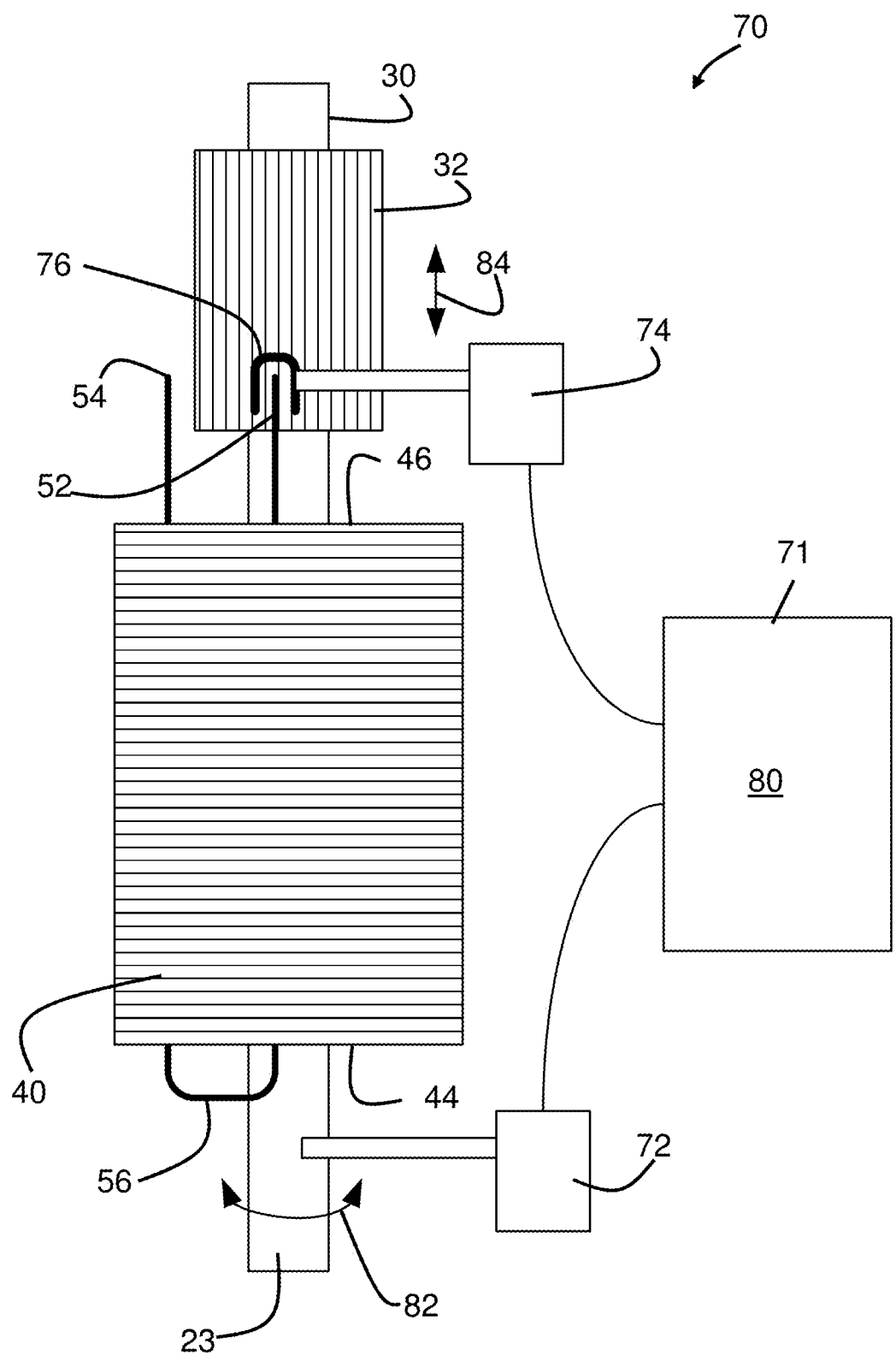
FIG. 5 is a schematic representation of a fabrication process according to one embodiment of the present invention.

FIG. 5 is a schematic representation of an armature 30 undergoing intermediate fabrication processes on a computer numerically-controlled machine (CNC). CNC machine 70 includes a computer 71 that is operably connected to a pair of actuators 72 and 74. In some embodiments, each of the actuators are adapted and configured to move armature 30 and conductor 50 relative to the machine in two different orthogonal directions. Actuator 74 is adapted and configured with a fixture 76 that captures within it a free end 52 of a conductor 50, such as the conductor shown previously in FIG. 4. It is understood that fixture 76 can be of any type, including a gripping mechanism, as examples.

In some embodiments, actuator 72 provides rotation of armature 30 as indicated by first direction 82. A second actuator 74 is adapted and configured to provide movement of an end fixture 76 in a second direction 84 that is generally parallel to the axis 23 of shaft 22.

The relative motion of armature 30 relative to CNC machine 70 is guided by the instructions of software 80 resident in memory within computer 71. Commands from computer 71 cause a synchronized response of actuators 72 and 74 according to a predetermined bending profile. Upon completion of the bending operation, the free end 52 of a conductor 50 is placed in the approximate-shape shown and discussed previously.

Figure 7:
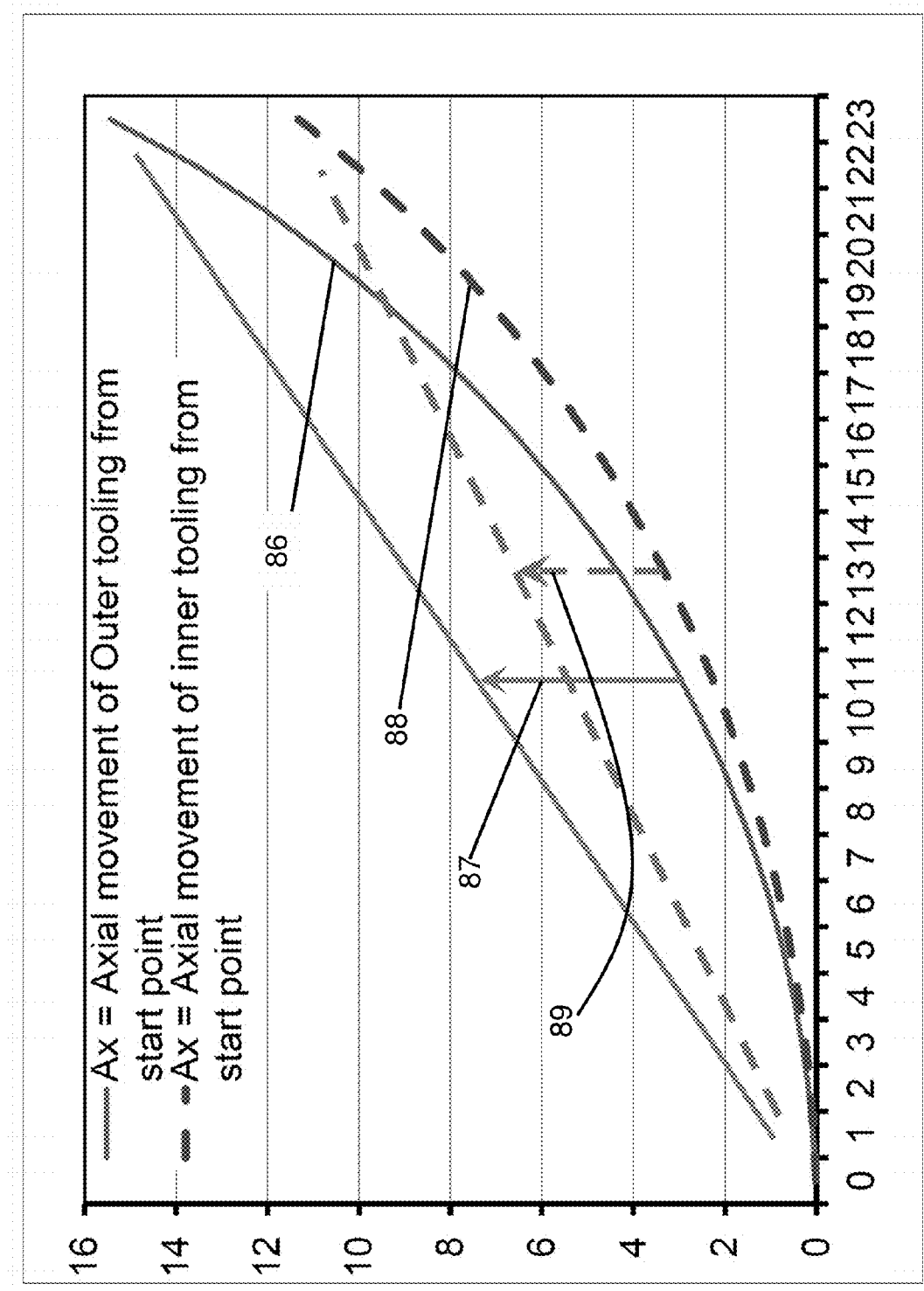
FIG. 7 is a graphical representation of a bending profile according to one embodiment of the present invention.

FIG. 7 is a graphical representation of two bending profiles 86 and 88. Software 80 applies bending profile 86 to a conductor 50-1 placed at a radially-outward location within a slot 48. Software 80 applies bending profile 88 to a conductor 50-2 placed at a radially-inward location within a slot 48.

FIG. 7 shows the amount of axial translation (typically compression) applied by fixture 70 to free end 52 as shaft 23 is rotated by actuator 72. Translation is shown on the Y-axis, and rotation is shown on the X-axis. It can be seen that bending profiles 86 and 88 monotonically increase in a non-linear fashion as a conductor is bent from its initial position (near 0 on the x-axis) to its final position (near 24 on the x-axis). In some embodiments, each of the profiles 86 and 88 can be approximated as parabolas. In yet other embodiments, the profiles are adapted and configured such that the slope of the profile increases as the amount of rotation increases.

The bending profiles shown in FIG. 7 were generated using the geometric assumptions shown in FIG. 8 and further described below. The example given is for an armature in which the laminate plates define 21 slots, and further in which the free end is twisted about two and one half slots for alignment with the corresponding conductor of the commuter. The mathematical operators shown below are consistent with the operators in Microsoft Excel:

lam Slots=21
Twist Slots=2.5
Outer Row Radius=OutRadius=33.610
MaxAngle=360/LamSlots*TwistSlots
Rise=Cuff Finger Bend Height
MaxChordOuter=2*OutRadius*SIN(0.5*MaxAngle*PI( )/180)
h Outer=Conductor length between bends=SQRT(Rise^2+MaxChordOuter^2)
ChordLength=2*r*sin(0.5*θ)=2*OutRadius*SIN (0.5*B12*π/180) where B12=angular step
α=Alpha=Bend Angle of conductors=ASIN(ChordLength/h_Outer)*180/π
Ax=Axial movement of Outer tooling from start points=h_Outer*(1−COS(Alpha*π/180))

The bending profiles can further be expressed in the following consolidated expression:

$$\sqrt{(Rise^2+(2*Radius*SIN(0.5*360/LamSlots*TwistSlots))^2)}*(1-COS(SIN^{-1}(2*Radius*SIN(0.5*\theta)/\sqrt{(Rise^2+(2*Radius*SIN(0.5*360/LamSlots*TwistSlots))^2)})))$$

FIG. 7 further shows bending profiles previous only used, and in which the axial compression of the end of the conductor is generally linear with respect to rotation of the armature relative to the free end of the conductor. It can be seen that a bending profile according to one embodiment of the present invention differs from the linear profiles with regards to the amount of axial movement (compression) imposed on the conductor, especially during the mid-portion of the bending profile. This difference between the linear profile and the inventive profile for the outermost conductor is indicated by arrow 87 and for the innermost conductor by arrow 89. It can be seen that the difference in the amount of imposed compression (between the linear profiles and the curved, inventive profiles) is greatest midway through the rotation of the armature relative to the conductor freehand. This excessive bending with the linear profile will result in higher bending stresses midway through the bending profile, with the subsequent possibility of excessive plastic deformation. It is thought that the inventive profiles 86 and 88 can result in better management of conductor stresses during the bending operation, and possibly less residual stress after the bending operation is completed.

It can further be seen that the incremental ending of the inventive profiles 86 and 88 are achieved with different slopes than the linear profile. It can be seen that the linear profile generally imposes too much bending in the first portion of the rotation, such that for each incremental movement of actuator 72 there is too much axial movement of actuator 74. With regards to the last portion of the rotation, it can be seen that the slopes of the inventive profiles 86 and 88 are generally greater than the constant slope of the corresponding linear profiles, with the result that there is generally too little bending in the last portion of the rotation.

In yet other embodiments, the innermost and outermost conductors are bent according to different nonlinear, monotonically increasing profiles. Again referring to FIG. 7, it can be seen that the slope of the bending profile 86 is generally greater than the slope of the bending profile 88 at comparable rotational positions.

The bending algorithms shown herein can be applied in any manner. For those embodiments fabricated with a CNC machine 70, the operation of actuators 72 and 74 can be substantially simultaneous, or can be accomplished serially and intermittently. Further, the command operation of actuators can be discrete or continuous.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of fabricating an armature for a motor, comprising:
providing a laminated assembly having a length, a central axis, and a plurality of open slots each extending the length and each adapted and configured to locate one conductor at a first greater radial distance and another conductor at a second lesser radial distance;
inserting a first conductor within one of the slots at the greater radial distance until the first conductor extends out of the slot;
using a computer numerically controlled machine to electronically actuatably bend the inserted first conductor in each of a first direction and a second direction, the first direction being orthogonal to the second direction, computer software being used to guide actuation of the bending according to a first nonlinear bending profile, the first nonlinear bending profile defining an amount of axial translation applied to a free end of the first conductor as the laminated assembly is rotated about its central axis;
inserting a second conductor within the slot at the lesser radial distance until the second conductor extends out of the slot; and
using the computer numerically controlled machine to electronically actuatably bend the inserted second conductor in each of the first and second orthogonal directions, the computer software being used to guide actuation of the bending according to a second nonlinear bending profile, wherein the second profile is different than the first profile, the second nonlinear bending profile defining an amount of axial translation applied to a free end of the second conductor as the laminated assembly is rotated about its central axis.

2. The method of claim 1 wherein one of the first or second orthogonal directions is rotation about the axis, the other of the first or second directions is translation parallel to the axis, and the second profile generally translates the second conductor less than the first profile translates the second conductor.

3. The method of claim 1 wherein the first profile relates bending to rotation and the second profile relates bending to rotation.

4. The method of claim 3 wherein the first profile is approximately parabolic, and the second profile is approximately parabolic.

5. The method of claim 1 wherein the first profile is approximately parabolic, and the second profile is approximately parabolic.

6. The method of claim 1 which further comprises joining the bent first conductor to the bent second conductor.

7. The method of claim 1 which further comprises placing the first conductor and the second conductor in electrical communication.

8. A method of fabricating an armature for a motor, comprising:
providing an assembly having a length, and a plurality of slots each extending the length and each adapted and configured to locate one conductor at a first greater radial distance and another conductor at a second lesser radial distance;
inserting a first conductor within a first one of the slots at the greater radial distance until the first conductor extends out of the first one of the slots;
using a computer numerically controlled machine to bend the inserted first conductor in each of a first direction and a second direction, the first direction being orthogonal to the second direction, computer software being used to guide actuation of the bending according to a first nonlinear bending profile, the first profile relating bending to rotation;
inserting a second conductor within a second one of the slots at the lesser radial distance until the second conductor extends out of the second one of the slots; and
using the computer numerically controlled machine to bend the inserted second conductor in each of the first and second orthogonal directions, the computer software being used to guide actuation of the bending according to a second nonlinear bending profile, wherein the second profile is different than the first profile, the second profile relating bending to rotation.

9. The method of claim 8 wherein the first profile is approximately parabolic, and the second profile is approximately parabolic.

10. A method of fabricating an armature for a motor, comprising:
providing a laminated assembly having a length, a central axis, and a plurality of open slots each extending the length and each adapted and configured to locate one conductor at a first greater radial distance from the central axis and another conductor at a second lesser radial distance from the central axis;
inserting a first conductor into a first one of the slots at the greater radial distance such that the first conductor extends out of the first one of the slots;
bending a free end of the inserted first conductor in each of a first direction and a second direction, the first direction being orthogonal to the second direction;
inserting a second conductor into a second one of the slots at the lesser radial distance such that the second conductor extends out of the second one of the slots; and
bending a free end of the inserted second conductor in each of the two orthogonal directions.

11. The method of claim 8 wherein the first nonlinear bending profile defines an amount of axial translation applied to a free end of the first conductor as the assembly is rotated about a central axis of the assembly, the second nonlinear bending profile defining an amount of axial translation applied to a free end of the second conductor as the assembly is rotated about the central axis of the assembly.

12. The method of claim 8 wherein the bending of the first conductor includes using the computer numerically controlled machine to electronically actuatably bend the inserted first conductor in each of the first and second orthogonal directions, and using the computer numerically controlled machine to electronically actuatably bend the inserted second conductor in each of the first and second orthogonal directions.

13. The method of claim 8 wherein the second one of the slots is the same as the first one of the slots.

14. The method of claim 8 wherein the second one of the slots is different from the first one of the slots.

15. The method of claim 10 wherein the bending of the first conductor is performed according to a first nonlinear bending profile, the first profile relating bending to rotation, and the bending of the second conductor is performed according to a second nonlinear bending profile, the second profile relating bending to rotation.

16. The method of claim 15 wherein the first nonlinear bending profile defines an amount of axial translation applied to a free end of the first conductor as the assembly is rotated about a central axis of the laminated assembly, the second nonlinear bending profile defining an amount of axial translation applied to a free end of the second conductor as the assembly is rotated about the central axis of the laminated assembly.

17. The method of claim 10 wherein the bending of the first conductor includes using the computer numerically controlled machine to electronically actuatably bend the inserted first conductor in each of the first and second orthogonal directions, and the bending of the second conductor includes using the computer numerically controlled machine to electronically actuatably bend the inserted second conductor in each of the first and second orthogonal directions.

18. The method of claim 10 wherein the second one of the slots is the same as the first one of the slots.

19. The method of claim 10 wherein the second one of the slots is different from the first one of the slots.

* * * * *